US006461719B1

(12) United States Patent
Ichikuni et al.

(10) Patent No.: US 6,461,719 B1
(45) Date of Patent: Oct. 8, 2002

(54) AGRICULTURAL COVERING MATERIAL

(75) Inventors: Naomi Ichikuni; Toru Ishida; Seitoku Kaya; Atsushi Funaki; Teruo Takakura, all of Kanagawa (JP)

(73) Assignee: Asahi Glass Company Limited, Tokyo (JP)

( * ) Notice: Subject to any disclaimer, the term of this patent is extended or adjusted under 35 U.S.C. 154(b) by 0 days.

(21) Appl. No.: 09/720,240

(22) PCT Filed: Jun. 23, 1999

(86) PCT No.: PCT/JP99/03342

§ 371 (c)(1),
(2), (4) Date: Dec. 22, 2000

(87) PCT Pub. No.: WO99/67333

PCT Pub. Date: Dec. 29, 1999

(30) Foreign Application Priority Data

| Jun. 23, 1998 | (JP) | 10-176320 |
| Jun. 23, 1998 | (JP) | 10-176321 |
| Jun. 26, 1998 | (JP) | 10-180886 |
| Jun. 26, 1998 | (JP) | 10-180887 |
| Jun. 29, 1998 | (JP) | 10-182781 |
| Jun. 29, 1998 | (JP) | 10-182782 |

(51) Int. Cl.$^7$ .............................. B32B 3/10; C08L 27/12
(52) U.S. Cl. ................ 428/147; 525/199; 525/240; 525/331.7; 428/98; 428/141; 428/220
(58) Field of Search .................. 525/199, 240, 525/331.7; 428/98, 141, 147, 220

(56) References Cited

U.S. PATENT DOCUMENTS

| 4,132,638 A | 1/1979 | Carlsson | 210/7 |
| 4,204,958 A | 5/1980 | Kaelin | 210/178 |
| 4,555,543 A * | 11/1985 | Effenberger et al. | 428/422 |
| 4,915,840 A | 4/1990 | Rozich | 210/605 |

FOREIGN PATENT DOCUMENTS

| EP | 0 159 268 | 10/1985 | |
| JP | 61-034044 | 2/1986 | |
| JP | 06-206088 | 7/1994 | C02F/03/12 |
| JP | 7-031295 | 2/1995 | |
| JP | 8-187823 | 7/1996 | |
| JP | 8-258228 | 10/1996 | |
| JP | 8-259731 | 10/1996 | |
| JP | 09-010791 | 1/1997 | C02F/3/12 |
| JP | 9-76428 | 3/1997 | |
| JP | 09-099298 | 4/1997 | C02F/11/02 |
| JP | 09-276887 | 10/1997 | C02F/3/12 |
| JP | 10-212362 | 8/1998 | |
| WO | WO 93/04988 | 3/1993 | C02F/3/12 |
| WO | WO 97/05072 | 2/1997 | C02F/3/12 |
| WO | WO 98/10000 | 3/1998 | |

OTHER PUBLICATIONS

*Sewage Service Project—Design Guide and Explanation,* vol. 2, pp. 218–241 (1994).

\* cited by examiner

*Primary Examiner*—Samuel A. Acquah
(74) *Attorney, Agent, or Firm*—Oblon, Spivak, McClelland, Maier & Neustadt, P.C.

(57) ABSTRACT

An agricultural covering material made of a fluorine-containing polymer film having a dynamic viscoelastic modulus of from 1 to 70 kg/mm$^2$, a tensile strength of from 1.5 to 5.0 kg/mm$^2$, a specific gravity of from 1.0 to 2.0 and a contact angle with water of at most 106°.

23 Claims, No Drawings

AGRICULTURAL COVERING MATERIAL

TECHNICAL FIELD

The present invention relates to an agricultural covering material. In particular, it relates to an agricultural covering material made of a fluoroplastic film with excellent flexibility, durability, dust resistance and light transmittance to be installed in agricultural and horticultural facilities such as tunnel houses, pipe houses and large-scaled greenhouses or used inside of a greenhouse as a greenhouse liner film.

BACKGROUND ART

Heretofore, as agricultural covering materials, films of polyethylene, ethylene-vinyl acetate copolymers, polyester resins, flexible vinyl chloride resins have been used, and the majority of agricultural covering materials are made of flexible vinyl chloride resin film for its superiority in ease of handling, price and thermal insulation over the other film materials. However, flexible vinyl chloride resin films have a problem of light transmittance reduction within a short term because their surfaces tend to be fouled by the plasticizers bleeding out of them.

The above-mentioned various films usually have to be renewed in a year or two due to deterioration by sunlight, atmospheric temperature, weather and oxidation although they include ultraviolet absorbers to improve in weatherability. Besides, these films including ultraviolet absorbers block out ultraviolet light to various degrees and therefore are unsuitable to crops that need ultraviolet light (such as eggplant and some kinds of flowers and ornamental plants) and crops (such as strawberry, melon, watermelon and bell pepper) that are pollinated through honeybees and *Eristalis cerealis* that need ultraviolet light for their activity.

On the other hand, practical large greenhouses have been introduced in recent years for labor-saving in greenhouse control, larger cultivated area and longer service life. In these large greenhouses, covering materials such as polyester resins, polycarbonate resins, rigid vinyl chloride resins, acrylic resins, fiber-reinforced plastics, sheet glass have been introduced for long-term use of at least 5 years. However, these covering materials are thick in thickness and heavy in weight and have to be installed in greenhouses with large frameworks made of special materials. Therefore, their installation is quite complicated, and they have a drawback of relatively high price. Besides, sheets of polyester resins, polycarbonate resins, rigid vinyl chloride resins and acrylic resins have drawbacks that they are easily cracked by hail and that cracks formed on them tend to spread.

In addition, these plastic sheets usually contain ultraviolet absorbers to improve in weatherability and are unsuitable to crops that need ultraviolet light (such as eggplant and some kinds of flowers and ornamental plants) and crops (such as strawberry, melon, watermelon and bell pepper) that are pollinated through honeybees and *Eristalis cerealis* that need ultraviolet light for their activity. Sheet glass is dangerous due to its fragility and requires stronger frameworks to be installed in greenhouses due to its weight heavier than those of plastic panels.

To overcome these problems, fluoroplastic films made of tetrafluoroethylene-ethylene copolymers (hereinafter referred to as ETFE) and vinyl fluoride polymers have been proposed as agricultural covering materials for their excellent properties such as durability and acid rain resistance, their proven service life of from 10 to 15 years, ease of being cleaned up by rainwater and resistance to breakage.

In general, when an agricultural covering material is installed in a pipe house or the like, it is fastened to the framework of the house with anchors so as not to loosen. However, some fluoroplastic films in use have to be stretched with great force to be fixed due to their poor flexibility resulting from their large moduli of elasticity.

Use of lining films inside of greenhouses is intended to prevent rapid temperature drops inside the greenhouses which frequently takes place during the day or at night, especially at night, in winter and to improve heating efficiency of the heater in the greenhouse, and sometimes to block part of excessive sunlight for the proper amount of insolation.

Thus, greenhouse lining films are frequently spread and folded during the day, in the evening or in the morning, and stiff films are difficult to fold and crease-prone.

DISCLOSURE OF THE INVENTION

The object of the present invention is to solve the above-mentioned problems by providing an agricultural covering material made of a fluoroplastic film with a small modulus of elasticity, excellent flexibility, a specific gravity smaller than that of a conventional fluoroplastic film and excellent handling property in installation. The present invention has made it possible to provide an agricultural covering material made of a fluoroplastic film excellent in not only flexibility but also toughness such as tensile strength.

Namely, the present invention provides an agricultural covering material made of a fluorine-containing polymer film having a dynamic viscoelastic modulus of from 1 to 70 $kg/mm^2$, a tensile strength of from 1.5 to 5.0 $kg/mm^2$, a specific gravity of from 1.0 to 2.0 and a contact angle with water of at most 106°.

BEST MODE FOR CARRYING OUT THE INVENTION

The fluorine-containing polymer film in the present invention is, for example, a film molded from a composition comprising 100 parts by weight of a tetrafluoroethylene (hereinafter referred to as TFE)-ethylene copolymer (hereinafter referred to as copolymer 1) and from 5 to 100 parts by weight of a tetrafluoroethylene-propylene elastic copolymer (hereinafter referred to as copolymer 2).

Copolymer 2 preferably comprises from 5 to 70 mol % of polymerization units derived from propylene.

Copolymer 1 may comprise polymerization units derived from TFE and polymerization units derived from ethylene in a (weight) ratio of from 70/30 to 30/70 and further comprise from 0.1 to 10 mol % of polymerization units derived from a compound represented by $CH=CH-C_nF_{2n+1}$ (wherein n is an integer of from 2 to 10).

In the present invention, the amount of copolymer 2 is from 5 to 100 parts by weight in relation to 100 parts by weight of copolymer 1. If the amount is smaller than 5 parts by weight, the resulting film does not have appreciable flexibility, and if the amount is larger than 100 parts by weight, the resulting film tends to have poor strength.

Copolymer 1 preferably comprises polymerization units derived from TFE and polymerization units derived from ethylene in a (molar) ratio of from 70/30 to 30/70, in particular in a (molar) ratio of from 65/35 to 45/55. If the ratio is larger than 70/30, film formation is difficult, and if the ratio is smaller than 30/70, the resulting film tends to be poor in wetherability and acid rain resistance.

When copolymer 1 further comprises polymerization units derived from a compound represented by $CH=CH-C_nF_{2n+1}$ (wherein n is an integer of from 2 to 10), the content is preferably from 0.1 to 10 mol %, in particular from 0.3 to 5 mol %. If the content is larger than 10 mol %, the resulting film tends to be poor in wetherability and acid rain resistance, and if content is smaller than 0.1 mol %, the resulting film tends to be poor in mechanical properties.

Copolymer 1 itself is not novel and can be obtained, for example, by the method disclosed in JP-B-59-50163. Various conventional polymerization techniques such as bulk polymerization, suspension polymerization, emulsion polymerization and solution polymerization are applicable to production of copolymer 1. Commercial products called "Aflon COP" (Asahi Glass Company) and "Aflon LM" (Asahi Glass Company) may be used as copolymer 1.

The molecular weight of copolymer 1 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 1 in a unit time (mm$^3$/sec) through a nozzle of 1 mm in diameter and 2 mm in length measured with a Koka-type flow tester at 300° C. under a load of 7 kg.

Copolymer 2 is a copolymer of TFE and propylene preferably comprising polymerization units derived from TFE and polymerization units derived from propylene in a (molar) ratio of from 95/5 to 30/70, in particular from 90/10 to 40/60. If the amount of the polymerization units derived from propylene is smaller than 5 mol %, copolymer 2 has poor elasticity and can not impart flexibility to the film, and if the amount of the polymerization units derived from propylene is larger than 70 mol %, the resulting film is poor in wetherability and acid rain resistance.

Copolymer 2 may comprise polymerization units derived from one or more additional comonomers. Such comonomers include α-olefins such as ethylene and isobutylene, acrylic acid, methacrylic acid and alkyl esters thereof, fluorine-containing olefins such as vinyl fluoride, vinylidene fluoride, hexafluoropropylene and chlorotrifluoroethylene and fluorine-containing vinyl ethers such as perfluoro(vinyl) ether.

The (total) amount of the polymerization units derived from these additional comonomer(s) in copolymer 2 is preferably smaller than 50 mol %, in particular smaller than 40 mol %.

The molecular weight of copolymer 2 is preferably at least 50,000, in particular at least 70,000, especially particularly from 100,000 to 250,000. An excessively low molecular weight would end in a film with poor mechanical properties, and an excessively high molecular weight would end in a composition with poor moldability.

Various polymerization techniques such as bulk polymerization, emulsion polymerization and solution polymerization are applicable to production of copolymer 2. A commercial product called "AFLAS" (Asahi Glass Company) may be used as copolymer 2.

The film made of a fluorine-containing polymer in the present invention is, for example, a film molded from a composition comprising 100 parts by weight of copolymer 1 mentioned above (a tetrafluoroethylene-ethylene copolymer) and from 5 to 80 parts by weight of a tetrafluoroethylene-propylene-ethylene copolymer (hereinafter referred to as copolymer 3).

Copolymer 3 preferably comprises from 40 to 70 mol % of polymerization units derived from TFE, from 10 to 50 mol % of polymerization units derived from propylene and from 1 to 50 mol % of polymerization units derived from ethylene, in particular from 45 to 60 mol % of polymerization units derived from TFE, from 30 to 45 mol % of polymerization units derived from propylene and from 3 to 30 mol % of polymerization units derived from ethylene. Copolymer 3 within this range is preferable for its low modulus of elasticity and flexibility.

Copolymer 3 may comprise polymerization units derived from one or more additional comonomers such as fluorine-containing olefins and hydrocarbon olefins. Such comonomer components include α-olefins such as 1-butene, 2-butene and isobutylene, fluorine-containing olefins such as (perfluorobutyl)ethylene, (perfluorohexyl)ethylene, (perfluorooctyl)ethylene, hexafluoropropylene, vinyl fluoride, vinyliden fluoride and trichlorofluoroethylene, fluorine-containing vinyl ethers such as perfluoro(ethyl vinyl ether), perfluoro(methyl vinyl ether) and perfluoro (propyl vinyl ether) and fluorine-containing acrylates.

The polymerization units derived from comonomer components in copolymer 3 are preferably in an amount of at most 50 mol %, in particular in such an amount as small as at most 10 mol % but effective for improvement of copolymer 3.

Various conventionally known polymerization techniques such as bulk polymerization, suspension polymerization, emulsion polymerization and solution polymerization are applicable to production of copolymer 3.

The molecular weights of copolymer 1 and copolymer 3 are not particularly limited but preferably correspond to a flow rate by volume of from 1 to 300 mm$^3$/sec, in 3 particular from 1 to 100 mm$^3$/sec, in view of physical properties and production of the film. The flow rate by volume is defined as an outflow by volume of a fluorine-containing copolymer in a unit time (mm$^3$/sec) through a nozzle of 1 mm in diameter and 2 mm in length measured with a Koka-type flow tester at 300° C. for copolymer 1 and at 200° C. for copolymer 3 under a load of 7 kg.

In the present invention, the amount of copolymer 3 is from 5 to 80 parts by weight in relation to 100 parts by weight of copolymer 1. If the amount is smaller than 5 parts by weight, the resulting film does not have appreciable flexibility, and if the amount is larger than 80 parts by weight, the resulting film tends to have poor strength.

The film made of a fluorine-containing polymer in the present invention is, for example, a film molded from a ,composition comprising 100 parts by weight of copolymer 1 mentioned above (a tetrafluoroethylene-ethylene copolymer) and from 5 to 200 parts by weight of a TFE-propylene-vinylidene fluoride (hereinafter referred to as VdF) copolymer (hereinafter referred to as copolymer 4).

Copolymer 4 preferably comprises from 5 to 85 mol % of polymerization units derived from TFE, from 1 to 45 mol % of polymerization units derived from propylene and from 5 to 70 mol % of polymerization units derived from VdF, in particular from 15 to 80 mol % of polymerization units derived from TFE, from 5 to 40 mol % of polymerization units derived from propylene and from 10 to 50 mol % of polymerization units derived from VdF. Copolymer 4 within this range is preferable for its small modulus of elasticity and flexibility.

Copolymer 4 may comprise polymerization units derived from one or more additional comonomers such as fluorine-containing olefins and hydrocarbon olefins. Such comonomer components include α-olefins such as propylene, 1-butene, 2-butene and isobutylene, fluorine-containing olefins such as (perfluorobutyl)ethylene, (perfluorohexyl) ethylene, (perfluorooctyl)ethylene, hexafluoropropylene, vinyl fluoride and trichlorofluoroethylene, fluorine-containing vinyl ethers such as perfluoro(ethyl vinyl ether), perfluoro(methyl vinyl ether) and perfluoro(propyl vinyl ether) and fluorine-containing acrylates.

The polymerization units derived from such comonomer components in copolymer 4 are preferably in an amount of at most 50 mol %, in particular in such an amount as small as at most 10 mol % but effective for improvement of copolymer 4.

Various conventionally known polymerization techniques such as bulk polymerization, suspension polymerization, emulsion polymerization and solution polymerization are applicable to production of copolymer 4.

The molecular weights of copolymer 1 and copolymer 4 are not particularly limited but preferably correspond to a flow rate by volume of from 1 to 300 mm$^3$/sec, in particular from 1 to 100 mm$^3$/sec, in view of physical properties and production of the film. The flow rate by volume is defined as an outflow by volume of a fluorine-containing copolymer in a unit time (mm$^3$/sec) through a nozzle of 1 mm in diameter and 2 mm in length measured with a Koka-type flow tester at 300° C. for copolymer 1 and at 200+ C. for copolymer 4 under a load of 7 kg.

In the present invention, the amount of copolymer 4 is from 5 to 200 parts by weight in relation to 100 parts by weight of copolymer 1. If the amount is smaller than 5 parts by weight, the resulting film does not have appreciable flexibility, and if the amount is larger than 200 parts by weight, the resulting film tends to have poor strength.

The film made of a fluorine-containing polymer in the present invention is, for example, a film molded from a composition comprising 100 parts by weight of a TFE-ethylene-propylene copolymer (hereinafter referred to as copolymer 5) and from 5 to 100 parts by weight of copolymer 2 mentioned above (a TFE-propylene elastic copolymer).

Copolymer 2 is preferably a copolymer comprising from 5 to 70 mol % of polymerization units derived from propylene.

Copolymer 5 may comprise polymerization units derived from one or more additional comonomers. Such additional comonomers include α-olefins such as 1-butene, 2-butene and isobutylene, fluorine-containing olefins such as vinylidene fluoride, hexafluoropropylene, trichlorofluoroethylene and vinyl fluoride, vinyl ethers such as ethyl vinyl ether, perfluoro(methyl vinyl ether) and perfluoro(propyl vinyl ether) and fluorine-containing acrylates. The polymerization units derived from such comonomer components in copolymer 5 are preferably in an amount of at most 50 mol %, in particular in such an amount as at most 10 mol % but effective for improvement of copolymer 5.

The molecular weight of copolymer 5 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 5 in a unit time (mm$^3$/sec) through a nozzle of 1 mm in diameter and 2 mm in length measured with a Koka-type flow tester at 200° C. under a load of 7 kg.

Various conventionally known polymerization techniques such as bulk polymerization, suspension polymerization, emulsion polymerization and solution polymerization are applicable to production of copolymer 5.

In the present invention, the amount of copolymer 2 is from 5 to 100 parts by weight in relation to 100 parts by weight of copolymer 5. If the amount is smaller than 5 parts by weight, the resulting film does not have appreciable flexibility, and if the amount is larger than 100 parts by weight, the resulting film tends to have poor strength.

The film made of a fluorine-containing polymer in the present invention is, for example, a film molded from a composition comprising 100 parts by weight of copolymer 5 mentioned above (a TFE-ethylene-propylene copolymer) and from 5 to 200 parts by weight of copolymer 4 mentioned above (a TFE-propylene-VdF copolymer).

Copolymer 5 preferably comprises from 40 to 70 mol % of polymerization units derived from TFE, from 20 to 50 mol % of polymerization units derived from ethylene and from 5 to 40 mol % of polymerization units derived from propylene, in particular from 45 to 65 mol % of polymerization units derived from TFE, from 20 to 45 mol % of polymerization units derived from ethylene and from 8 to 25 mol % of polymerization units derived from propylene. Copolymer 5 within this range is preferable for its compatibility with copolymer 4 and appropriate tensile strength.

Copolymer 5 may comprise polymerization units derived from one or more comonomer components such as fluorine-containing olefins and hydrocarbon olefins. Such comonomer components include α-olefins such as 1-butene and isobutylene, fluorine-containing olefins such as hexafluoropropylene, trichlorofluoroethylene and vinyl fluoride, vinyl ethers such as perfluoro(methyl vinyl ether) and perfluoro(propyl vinyl ether) and fluorine-containing acrylates. The polymerization units derived from comonomer components in the copolymer are preferably in an amount of at most 50 mol %, in particular in such an amount as small as at most 10 mol % but effective for improvement of copolymer 5.

The molecular weights of copolymer 4 and copolymer 5 are not particularly limited but preferably correspond to a flow rate by volume of from 1 to 300 mm$^3$/sec, in particular from 1 to 100 mm$^3$/sec, in view of physical properties and production of the film. The flow rate by volume is defined as an outflow by volume of a copolymer in a unit time (mm$^3$/sec) through a nozzle of 1 mm in diameter and 2 mm in length measured with a Koka-type flow tester at 200° C. under a load of 7 kg.

In the present invention, the amount of copolymer 4 is from 5 to 200 parts by weight in relation to 100 parts by weight of copolymer 5. If the amount is smaller than 5 parts by weight, the resulting film does not have appreciable flexibility, and if the amount is larger than 200 parts by weight, the resulting film tends to have poor strength.

The film made of a fluorine-containing polymer in the present invention is, for example, a film of a fluorine-containing copolymer (hereinafter referred to as copolymer 6) comprising from 5 to 84 mol % of polymerization units derived from tetrafluoroethylene (TFE), from 1 to 45 mol % of polymerization units derived from hexafluoropropylene (hereinafter referred to as HFP) and from 5 to 90 mol % of polymerization units derived from vinyliden fluoride (VdF).

In particular, a film of copolymer 6 comprising from 10 to 80 mol % of polymerization units derived from TFE, from 5 to 30 mol % of polymerization units derived from HFP and from 15 to 85 mol % of polymerization units derived from VdF is preferable.

One or more additional comonomer components such as fluorine-containing olefins and hydrocarbon olefins may be copolymerized to prepare copolymer 6. Such comonomer components include α-olefins such as propylene, a butene and isobutylene, fluorine-containing olefins such as trichlorofluoroethylene and vinyl fluoride, vinyl ethers such as ethyl vinyl ether, perfluoromethyl vinyl ether and perfluoropropyl vinyl ether and fluorine-containing acrylates. These copolymer components in copolymer 6 are preferably copolymerized in an amount of at most 50 mol %, in particular in such an amount as small as at most 10 mol % but effective for improvement of copolymer 6.

Various conventionally known polymerization techniques such as bulk polymerization, suspension polymerization, emulsion polymerization and solution polymerization are applicable to production of copolymer 6.

The molecular weight of copolymer 6 is not particularly limited but preferably corresponds to a flow rate by volume of from 5 to 300 mm$^3$/sec, in particular from 10 to 100 mm$^3$/sec, in view of physical properties and production of the film. The flow rate by volume is defined as an outflow by volume of copolymer 6 in a unit time (mm$^3$/sec) through a nozzle of 1 mm in diameter and 2 mm in length measured with a Koka-type flow tester at 200° C. under a load of 7 kg.

The film made of a fluorine-containing polymer in the present invention is, for example, a film of a fluorine-containing copolymer (hereinafter referred to as copolymer 7) comprising from 5 to 85 mol % of polymerization units derived from TFE, from 1 to 50 mol % of polymerization units derived from propylene and from 5 to 70 mol % of polymerization units derived from VdF.

In particular, a film of copolymer 7 comprising from 15 to 80 mol % of polymerization units derived from TFE, from 5 to 40 mol % of polymerization units derived from propylene and from 10 to 50 mol % of polymerization units derived from VdF is preferable.

One or more additional comonomer components such as fluorine-containing olefins and hydrocarbon olefins may be copolymerized to prepare copolymer 7. Such comonomer components include α-olefins such as propylene, a butene and isobutylene, fluorine-containing olefins such as trichlorofluoroethylene and vinyl fluoride, vinyl ethers such as ethyl vinyl ether, perfluoromethyl vinyl ether and perfluoropropyl vinyl ether and fluorine-containing acrylates. These copolymer components in copolymer 7 are preferably copolymerized in an amount of at most 50 mol %, in particular in such an amount as small as at most 10 mol % but effective for improvement of copolymer 7.

Various conventionally known polymerization techniques such as bulk polymerization, suspension polymerization, emulsion polymerization and solution polymerization are applicable to production of copolymer 7.

The molecular weight of copolymer 7 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 7 in a unit time (mm$^3$/sec) through a nozzle of 1 mm in diameter and 2 mm in length measured with a Koka-type flow tester at 200° C. under a load of 7 kg.

The film made of a fluorine-containing polymer in the present invention is, for example, a film of a fluorine-containing copolymer (hereinafter referred to as copolymer 8) comprising from 0.05 to 20 mol % in total of polymerization units derived from at least one fluorinated comonomer represented by the following formula 1, formula 2 or formula 3, 30 to 85 mol % of polymerization units derived from TFE, from 1 to 30 mol % of polymerization units derived from propylene and from 5 to 68.5 mol % of polymerization units derived from VdF.

In the following formula 1, formula 2 and formula 3, Y is a fluorine atom or a hydrogen atom, R$^f$ is a C$_{2-12}$ bivalent fluorine-substituted organic group, X is a fluorine atom, a chlorine atom or a hydrogen atom, n is an integer of from 0 to 3, and m is an integer of from 1 to 4.

XR$^f$CY=CH$_2$        formula 1

XR$^f$OCF=CF$_2$        formula 2

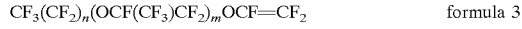

CF$_3$(CF$_2$)$_n$(OCF(CF$_3$)CF$_2$)$_m$OCF=CF$_2$        formula 3

At least one fluorinated comonomer selected from formula 1, formula 2 or formula 3 is used. The bivalent fluorine-substituted organic group as R$^f$ is substituted with at least one fluorine atom and is preferably a completely fluorinated fluorine-substituted organic group. R$^f$ is preferably a bivalent fluorine-substituted organic group having a chain made of carbon only or made of carbon and oxygen.

Specific examples of R$^f$ include a perfluoroalkylene group or a perfluoroalkylene group with an ether linkage. The carbon number of R$^f$ is from 2 to 12, preferably from 2 to 10. R$^f$ is preferably linear but may be branched. When it is branched, a short branch having a carbon number of from 1 to 3 is preferable.

Specific examples of preferable fluorinated comonomers include (perfluoroalkyl)ethylenes such as (perfluorobutyl) ethylene, (perfluorohexyl)ethylene and (perfluorooctyl) ethylene, perfluoro(alkyl vinyl ethers) such as perfluoro (methyl vinyl ether), perfluoro(ethyl vinyl ether) and perfluoro(propyl vinyl ether) and compounds of formula 3 wherein n is 0 or 1, and m is 1 or 2.

In addition to the above-mentioned components such as fluorinated comonomers, TFE, propylene and VdF, one or more comonomer such as α-olefins like ethylene and isobutylene, acrylic acid and its esters, methacrylic acid and its esters, fluorine-containing olefins like trichlorofluoroethylene, alkyl vinyl ethers like ethyl vinyl ether and butyl vinyl ether and vinyl esters like vinyl acetate and vinyl benzoate may be copolymerized to prepare copolymer 8. The amount of polymerization units derived from these comonomers in copolymer 8 is preferably at most 10 mol % in total in order to secure copolymer 8 with excellent properties. Various conventionally known polymerization techniques such as bulk polymerization, suspension polymerization, emulsion polymerization and solution polymerization are applicable to production of copolymer 8.

The molecular weight of copolymer 8 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 8 in a unit time (mm$^3$/sec) through a nozzle of 1 mm in diameter and 2 mm in length measured with a Koka-type flow tester at 200° C. under a load of 7 kg.

The film made of a fluorine-containing polymer in the present invention is, for example, a film of copolymer 9 comprising from 40 to 75 mol % of polymerization units derived from tetrafluoroethylene, from 20 to 50 mol % of polymerization units derived from ethylene and from 5 to 40 mol % of polymerization units derived from propylene.

Copolymer 9 may comprise polymerization units derived form one or more additional comonomer components such as fluorine-containing olefins and hydrocarbon olefins. Such comonomer components include α-olefins such as 1-butene, 2-butene and isobutylene, fluorine-containing olefins such as (perfluorobutyl)ethylene, (perfluorohexyl) ethylene, (perfluorooctyl) ethylene, hexafluoropropylene, vinyl fluoride and trichlorofluoroethylene, fluorine-containing vinyl ethers such as perfluoro(ethyl vinyl ether), perfluoro(methyl vinyl ether) and perfluoro(propyl vinyl ether) and fluorine-containing acrylates.

The polymerization units derived from comonomer components in copolymer 9 is preferably in an amount of at most 30 mol %, in particular in such an amount as small as at most 10 mol % but effective for improvement of copolymer 9.

Various conventionally known polymerization techniques such as bulk polymerization, suspension polymerization, emulsion polymerization and solution polymerization are applicable to production of copolymer 9.

The molecular weight of copolymer 9 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 9 in a unit time (mm$^3$/sec) through a nozzle of 1 mm in diameter and 2 mm in length measured with a Koka-type flow tester at 200° C. under a load of 7 kg.

The film made of a fluorine-containing polymer in the present invention is, for example, a film of a TFE-ethylene-third vinyl monomer copolymer (hereinafter referred to as copolymer 10) which comprises polymerization units derived from TFE and polymerization units derived from ethylene in a (molar) ratio of from 57/43 to 67/33 and comprises from 0.1 to 10 (mol %) of polymerization units derived from a third vinyl monomer.

The molar ratio of the polymerization units derived from tetrafluoroethylene/the polymerization units derived from ethylene in copolymer 10 mentioned above is preferably from 61/39 to 67/33.

The third vinyl monomer in copolymer 10 is a (perfluoroalkyl) ethylene represented by $CH_2=CH-C_nF_{2n+1}$ (wherein n is an integer of from 2 to 10).

Copolymer 10 is a copolymer of TFE and ethylene with the third vinyl monomer. As the third vinyl monomer, an α-olefin such as 1-butene or isobutylene, a fluorine-containing olefin such as vinylidene fluorine, hexafluoropropylene, trichlorofluoroethylene or vinyl fluoride, a vinyl ether such as a (perfluoroalkyl)ethylene, ethyl vinyl ether, perfluoro(methyl vinyl ether) or perfluoro (propyl vinyl ether) or a fluorine-containing acrylate may be mentioned. Preferred is a perfluoroalkyl)ethylene represented by $CH_2=CH-C_nF_{2n+1}$ (wherein n is an integer of from 2 to 10).

The amount of polymerization units derived from the third vinyl monomer in copolymer 10 is preferably from 0.1 to 10 mol %, in particular from 0.3 to 5 mol %. Copolymer 10 comprising polymerization units derived from TFE and polymerization units derived from ethylene in a molar ratio of from 57/43 to 67/33 and from 0.1 to 10 (mol %) of polymerization units derived from a third vinyl monomer is preferable as an agricultural covering material for its low modulus of elasticity and its flexibility. The low modulus of elasticity is supposed to be attributable to the low crystallinity of copolymer 10.

Various conventionally known polymerization techniques such as bulk polymerization, suspension polymerization, emulsion polymerization and solution polymerization are applicable to production of copolymer 10.

The molecular weight of copolymer 10 is not particularly limited but preferably corresponds to a flow rate by volume of from 1 to 300 mm$^3$/sec, in particular from 1 to 100 mm$^3$/sec, in view of physical properties and production of the film. The flow rate by volume is defined as an outflow by volume of copolymer 10 in a unit time (mm$^3$/sec) through a nozzle of 1 mm in diameter and 2 mm in length measured with a Koka-type flow tester at 300° C. under a load of 7 kg.

An agricultural covering material is preferred to be a flexible film for ease of fastening to the framework of a greenhouse. The film made of a fluorine-containing polymer of the present invention has a dynamic viscoelastic modulus of from 1 to 70 kg/mm$^2$ and excellent flexibility and is preferred to have a dynamic viscoelastic modulus of from 3 to 60 kg/mm$^2$.

The film made of a fluorine-containing polymer in the present invention not only is excellent in flexibility but also has a tensile strength as excellent as from 1.5 to 5.0 kg/mm$^2$ and a relatively small specific gravity of from 1.0 to 2.0.

The film in the present invention is molded by known molding methods such as inflation and extrusion molding. If the film is too thin, it easily tears, and if the film is too thick, it is tough to cut, bond and unfold, and the light transmittance is low. The thickness is preferably from 10 to 300 μm, in particular from 20 to 100 μm, and the preferable film width is usually from 1000 to 2000 mm in view of production and handling of the film.

The fluorine-containing polymer in the present invention may be blended with colorants such as titanium oxide, zinc flower, calcium carbonate, precipitated silica, carbon black, chrome yellow, Phthalocyanine Blue and Phthalocyanine Green, if necessary, when molded into a film.

The inside of a greenhouse as an agricultural and horticultural facility is usually warm and humid, and moisture droplets tends to be formed on the underside and the inner side by condensation. The moisture droplets hinder healthy growth of the plants under it by blocking sun light and by falling down on the plants. Therefore, it is desirable that the contact angle of the film with water is not large. The film of the present invention has a contact angle with water of at most 106°. Films of fluoroplastics with no hydrogen atoms are unfavorable due to their contact angles of more than 106°.

It is desirable to treat the inner surface of a greenhouse with a anti-drop agent such as a mixture of an alcohol-dissolved or water-dispersed fluoroplastic and an inorganic hydrophilic colloidal substance, a mixture of a hydrophilic polymer and a surfactant and a mixture of a hydrophilic polymer, a surfactant and an inorganic hydrophilic colloidal substance in order to avoid moisture droplets from staying there. As the inorganic hydrophilic colloidal substance, colloidal silica, colloidal alumina or colloidal titania may be used. Hydrophilic polymers include polyvinyl alcohol and polymers with general hydrophilic functional groups such as $-SO_3H$, $-COOH$, $-NH_2$, $-CN$ and $-(OCH_2CH_2)_n$. The surfactant may be anionic, cationic or nonionic.

Due to the low contact angle with water of at most 106°, the film of the present invention has affinity advantageous in various surface treatments and blending.

The film of the present invention can be installed in not only a tunnel house and a pipe house but also a practical large greenhouse as an agricultural covering material and can be used as a greenhouse liner film for enclosed crop cultivation like ordinary agricultural covering materials.

Now, the present invention will be described in further details by referring to Examples and Comparative Examples. However, the present invention is by no means restricted thereby.

The dynamic viscoelastic modulus as an indicator of flexibility was measured at 25° C. with a dynamic viscoelastometer (Toyo Seiki, model rheolograph solid L-1).

For the transparency, the total light transmittance and the haze were measured with a hazemeter (Nihon Seimitsu Kogaku, model SEP-T) as indicators of transparency.

The specific gravity was measured in accordance with JIS K-7112 method A.

The contact angle with water was measured with a contact angle meter (Kyowa Interface Science Co., Ltd., model CA-X).

The handling property in installation was rated on the basis of the difficulty in installation of the film by spreading it out and fastening it to the framework with pegs, as ○ (easy to install), Δ (more difficult to install than a flexible vinyl chloride resin) or X (installable but laboriously stiff and crease-prone).

The handling property in folding was rated on the basis of the difficulty in unfolding and folding the lining film for greenhouses as ○ (easy to fold), Δ (stiff) or X (not foldable).

[Preparation of Copolymer A]

1966 g of perfluorocyclohexane, 14.7 g of methanol, 250 g of TFE, 17.5 g of ethylene (hereinafter referred to as ET) and 17.4 g of (perfluorobutyl)ethylene (hereinafter referred to as PFBE) were introduced into a deaerated stainless autoclave with an internal volume of 2 l equipped with a stirrer and heated to 65° C. 14 ml of 10% t-butyl peroxyisobutyrate in perfluorocyclohexane was injected to initiate polymerization. The reaction was carried out at a pressure of 15.0 kg/cm$^2$G while a 53/47 (molar ratio) gas mixture of TFE/ET was introduced to compensate the pressure loss accompanying the reaction. The reaction was continued for 8 hours while 0.1 ml of PFBE was added in relation to 2 g of the gas mixture.

After the reaction was over, the reactor was purged of the remaining monomers, and the copolymer dispersant was filtered, washed and dried to give 164 g of white copolymer A. Copolymer A was found to comprise polymerization units derived from TFE, polymerization units derived from ET and polymerization units derived from PFBE in a (molar) ratio of 53.1/45.5/1.4 by NMR analysis and had a melting point of 260° C. and a flow rate by volume of 51.6 mm$^3$/sec.

[Preparation of Copolymer B]

1966 g of perfluorocyclohexane, 14.2 g of methanol, 250 g of TFE, 7.8 g of ET and 31.8 g of PFBE were introduced into a deaerated stainless autoclave with an internal volume of 2 l equipped with a stirrer and heated to 65° C. 7 ml of 50% t-butyl peroxyisobutyrate in perfluorocyclohexane was injected to initiate polymerization. The reaction was carried out at a pressure of 14.3 kg/cm$^2$G while a 60/40(molar ratio) gas mixture of TFE/ET was introduced to compensate the pressure loss accompanying the reaction. The reaction was continued for 8 hours while 0.1 ml of PFBE was added in relation to 1 g of the gas mixture.

After the reaction was over, the reactor was purged of the remaining monomers, and the copolymer dispersant was filtered, washed and dried to give 204 g of white copolymer B. Copolymer B was found to comprise polymerization units derived from TFE, polymerization units derived from ET and polymerization units derived from PFBE in a (molar) ratio of 58.9/37.3/3.8 by NMR analysis and had a melting point of 220° C. and a flow rate by volume of 85.2 mm$^3$/sec.

EXAMPLE 1

Working Example

A composition comprising 140 parts by weight of copolymer A and 30 parts by weight of AFLAS 100N (Asahi Glass Company, polymerization units derived from TFE/polymerization units derived from propylene=56/44 (molar ratio)) was extruded through a 30 mm φ extruder with a T die of 600 mm wide into a film of 50 μm thick at a die temperature of 320° C. The mechanical properties [dynamic viscoelesticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 1. The amounts in Table 1 were expressed in parts by weight.

EXAMPLES 2 to 3

Working Examples

Films were formed in the same manner as in Example 1 except that the amount of AFLAS 100N was changed to 60 parts by weight and 100 parts by weight respectively. The mechanical properties and the transparency of the films were measured, and the handling property in installation and the handling property in folding were evaluated. The results were shown in Table 1.

EXAMPLES 4 to 6

Working Examples

Compositions comprising 100 parts by weight of copolymer B and the amounts shown in Table 1 of AFLAS 100N were extruded into films of 50 μm thick at a die temperature 270° C. The mechanical properties and the transparency of the films were measured, and the handling property in installation and the handling property in folding were evaluated in the same manners as in Example 1. The results were shown in Table 1.

EXAMPLE 7

Comparative Example

Copolymer A was extruded into a film of 60 μm thick at a die temperature 320° C. The film was evaluated in the same manners as in Example 1. The results were shown in Table 1.

EXAMPLE 8

Comparative Example

A polyvinyl fluoride film of 50 μm thick (Tedlar 200SG40TR, DuPont) was evaluated in the same manners as in Example 1. The results are shown in Table 1.

EXAMPLE 9

Comparative Example

Aflon PFA P-66P (tetrafluoroethylene-perfluoroalkyl vinyl ether copolymer, Asahi Glass Company) was extruded at 380° C. into a film of 50 μm thick. The film was evaluated in the same manners as in Example 1. The results are shown in Table 1.

EXAMPLE 10

Comparative Example

Aflon FEP H330 (tetrafluoroethylene-hexafluoropropylene copolymer, Asahi Glass Company) was extruded at 320° C. into a film of 50 μm thick. The film was evaluated in the same manners as in Example 1. The results are shown in Table 1.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Copolymer A | 100 | 100 | 100 |  |  |  | 100 |  |  |  |
| Copolymer B |  |  |  | 100 | 100 | 100 |  |  |  |  |
| AFLAS 100N | 30 | 60 | 100 | 30 | 60 | 100 |  |  |  |  |
| Dynamic viscoelasticity (kg/mm$^2$) | 69 | 65 | 58 | 54 | 50 | 44 | 96 | 184 | 55 | 52 |
| Tensile strength (kg/mm$^2$) | 3.8 | 3.1 | 2.1 | 3.4 | 2.7 | 1.8 | 4.7 | 12.7 | 4.4 | 2.7 |
| Total light transmittance (%) | 92 | 91 | 88 | 94 | 94 | 90 | 91 | 82 | 96 | 93 |
| Haze (%) | 9 | 15 | 17 | 7 | 12 | 16 | 4 | 23 | 4 | 6 |
| Specific gravity | 1.69 | 1.66 | 1.61 | 1.68 | 1.64 | 1.59 | 1.74 | 1.37 | 2.13 | 2.13 |
| Contact angle (°) | 96.9 | 96.1 | 95.8 | 89.5 | 87.8 | 86.9 | 103.9 | 80.3 | 109.3 | 107.7 |
| Handling property in installation | ○ | ○ | ○ | ○ | ○ | ○ | Δ | X | Δ | Δ |
| Handling property in folding | ○ | ○ | ○ | ○ | ○ | ○ | Δ | X | Δ | Δ |

[Preparation of Copolymer C]

1387 g of perfluorocyclohexane, 162 g of TFE, 13.4 g of propylene (hereinafter referred to as PP) and 1.7 g of ET were introduced into a deaerated stainless autoclave with an internal volume of 1.3 l equipped with a stirrer and heated to 66° C. 9 ml of 5% t-butyl peroxyisobutyrate in perfluorocyclohexane was injected to initiate polymerization.

The reaction was continued at a pressure of 14.4 kg/cm$^2$G for 8 hours while a 54/8/38 (molar ratio) gas mixture of TFE/PP/ET was introduced to compensate the pressure loss accompanying the reaction. After the reaction was over, the reactor was purged of the remaining monomers, and the copolymer dispersant was filtered, washed and dried to give 88 g of white copolymer C. Copolymer C was found to comprise polymerization units derived from TFE, polymerization units derived from PP and polymerization units derived from ET in a (molar) ratio of 53.2/38.4/8.4 by NMR analysis and had a flow rate by volume of 92.3 mm$^3$/sec.

[Preparation of Copolymer D]

635 g of deionized water, 5 g of ammonium perfluorooctanoate, 32.6 g of TFE, 0.6 g of PP and 0.3 g of ET were introduced into a deaerated stainless autoclave with an internal volume of 1 l equipped with a stirrer and heated to 80° C. 5 ml of 30% aqueous ammonium persulfate was injected to initiate polymerization.

The reaction was continued at a pressure of 17.7 kg/cm$^2$G for 7 hours while a 61/21/18 (molar ratio) gas mixture of TFE/PP/ET was introduced to compensate the pressure loss accompanying the reaction. After the reaction was over, the reactor was purged of the remaining monomers to obtain 837 g of a copolymer dispersion. The dispersion latex was coagulated by dropwise addition of sulfuric acid, then washed and dried to give 194 g of copolymer D. Copolymer D was found to comprise polymerization units derived from TFE, polymerization units derived from PP and polymerization units derived from ET in a (molar) ratio of 62.1/21.6/16.3 by NMR analysis and had a flow rate by volume of 78.2 mm$^3$/sec.

EXAMPLE 11

Working Example

A composition comprising 100 parts by weight of copolymer A and 20 parts by weight of copolymer C was extruded through a 30 mm φ extruder with a T die of 600 mm wide into a film of 50 µm thick at a die temperature of 320° C. The mechanical properties [dynamic viscoelasticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 2. The amounts in Table 2 were expressed in parts by weight.

EXAMPLE 12

Working Example

A film was formed in the same manner as in Example 11 except that the amount of copolymer C was changed to 40 parts by weight. The mechanical properties and the transparency of the film were measured, and the handling property in installation and the handling property in folding were evaluated. The results were shown in Table 2.

EXAMPLE 13

Working Example

A film was formed in the same manner as in Example 11 except that 60 parts by weight of copolymer D was used instead of copolymer C. The mechanical properties and the transparency of the film were measured, and the handling property in installation and the handling property in folding were evaluated. The results were shown in Table 2.

EXAMPLE 14

Working Example A composition comprising 100 parts by weight of copolymer B and 60 parts by weight of copolymer C was extruded through the same extruder as used in Example 11 into a film of 50 µm thick at a die temperature of 275° C. The mechanical properties and the transparency of the film were measured, and the handling property in installation and the handling property in folding were evaluated. The results were shown in Table 2.

EXAMPLE 15

Working Example

A film was formed in the same manner as in Example 14 except that 20 parts by weight of copolymer D was used instead of copolymer C. The mechanical properties and the transparency of the film were measured, and the handling property in installation and the handling property in folding were evaluated. The results were shown in Table 2.

EXAMPLE 16

Working Example

A film was formed in the same manner as in Example 14 except that 40 parts by weight of copolymer D was used instead of copolymer C. The mechanical properties and the transparency of the film were measured, and the handling property in installation and the handling property in folding were evaluated. The results were shown in Table 2.

polymerization units derived from TFE, polymerization units derived from PP, polymerization units derived from VdF and polymerization units derived from PFBE in a (molar) ratio of 59.9/11.4/27.3/1.4 by NMR analysis and had a melting point of 139° C. and a flow rate by volume of 37.7 mm$^3$/sec.

EXAMPLE 17

Working Example

A composition comprising 100 parts by weight of copolymer A and 50 parts by weight of copolymer E was extruded

TABLE 2

| | Ex. 11 | Ex. 12 | Ex. 13 | Ex. 14 | Ex. 15 | Ex. 16 | Ex. 7 | Ex. 8 | Ex. 9 | Ex. 10 |
|---|---|---|---|---|---|---|---|---|---|---|
| Copolymer A | 100 | 100 | 100 | | | | 100 | | | |
| Copolymer B | | | | 100 | 100 | 100 | | | | |
| Copolymer C | 20 | 40 | | 60 | | | | | | |
| Copolymer D | | | 60 | | 20 | 40 | | | | |
| Dynamic viscoelasticity (kg/mm$^2$) | 62 | 51 | 44 | 42 | 57 | 49 | 96 | 184 | 55 | 52 |
| Tensile strength (kg/mm$^2$) | 4.3 | 3.9 | 3.7 | 3.6 | 4.1 | 3.9 | 4.7 | 12.7 | 4.4 | 2.7 |
| Total light transmittance (%) | 93 | 91 | 91 | 91 | 92 | 91 | 91 | 82 | 96 | 93 |
| Haze (%) | 12 | 15 | 16 | 15 | 11 | 9 | 4 | 23 | 4 | 6 |
| Specific gravity | 1.73 | 1.71 | 1.68 | 1.65 | 1.70 | 1.68 | 1.74 | 1.37 | 2.13 | 2.13 |
| Contact angle (°) | 102.9 | 102.6 | 101.3 | 92.5 | 94.3 | 93.8 | 103.9 | 80.3 | 109.3 | 107.7 |
| Handling property in installation | ○ | ○ | ○ | ○ | ○ | ○ | Δ | X | Δ | Δ |
| Handling property in folding | ○ | ○ | ○ | ○ | ○ | ○ | Δ | X | Δ | Δ |

[Preparation of copolymer E]

635 g of deionized water, 5 g of ammonium perfluorooctanoate, 15.8 g of TFE, 0.3 g of PP and 11.9 g of VdF were introduced into a deaerated stainless autoclave with an internal volume of 1 l equipped with a stirrer and heated to 70° C. 5 ml of 30% aqueous ammonium persulfate was injected to initiate polymerization.

The reaction was continued at a pressure of 16.7 kg/cm$^2$G for 7.2 hours while a 45/45/10 (molar ratio) gas mixture of TFE/PP/VdF was introduced to compensate the pressure loss accompanying the reaction. After the reaction was over, the reactor was purged of the remaining monomers to obtain 818 g of a copolymer dispersion. The dispersion was coagulated by dropwise addition of ammonium chloride then washed and dried to give 188 g of copolymer E. Copolymer E was found to comprise polymerization units derived from TFE, polymerization units derived from PP and polymerization units derived from VdF in a (molar) ratio of 47.5/11.2/41.3 by NMR analysis and had a melting point of 127° C. and a flow rate by volume of 57.3 mm$^3$/sec.

[Preparation of copolymer F]

635 g of deionized water, 5 g of ammonium perfluorooctanoate, 14.9 g of TFE, 1.4 g of PP, 9.7 g of VdF and 1.2 g of PFBE were introduced into a deaerated stainless autoclave with an internal volume of 1 l equipped with a stirrer and heated to 80° C. 5 ml of 30% aqueous ammonium persulfate was injected to initiate polymerization. The reaction was carried out at a pressure of 18.3 kg/cm$^2$G while a 58/10/32 (molar ratio) gas mixture of TFE/PP/VdF was introduced to compensate the pressure loss accompanying the reaction. The reaction was continued for 8 hours while 0.1 ml of PFBE was added in relation to 3 g of the gas mixture. After the reaction was over, the reactor was purged of the remaining monomers to give 840 g of a copolymer dispersion. The dispersion latex was coagulated by dropwise addition of sulfuric acid, then washed and dried to give 194 g of copolymer F. Copolymer F was found to comprise through a 30 mm φ extruder with a T die of 600 mm wide into a film of 50 μm thick at a die temperature of 320° C. The mechanical properties [dynamic viscoelasticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 3. The amounts in Table 3 were expressed in parts by weight.

EXAMPLE 18

Working Example

A film was formed in the same manner as in Example 17 except that the amount of copolymer E was changed to 120 parts by weight. The mechanical properties and the transparency of the film were measured, and the handling property in installation and the handling property in folding were evaluated. The results were shown in Table 3.

EXAMPLE 19

Working Example

A film was formed in the same manner as in Example 17 except that 100 parts by weight of copolymer F was used instead of copolymer E. The mechanical properties and the transparency of the film were measured, and the handling property in installation and the handling property in folding were evaluated. The results were shown in Table 3.

EXAMPLE 20

Working Example

A composition comprising 100 parts by weight of copolymer B and 120 parts by weight of copolymer E was extruded through the same extruder as used in Example 17 into a film of 50 μm thick at a die temperature of 275° C. The mechanical properties and the transparency of the film were measured, and the handling property in installation and the handling property in folding were evaluated. The results were shown in Table 3.

EXAMPLE 21

Working Example

A film was formed in the same manner as in Example 20 except that 50 parts by weight of copolymer F was used instead of copolymer E. The mechanical properties and the transparency of the film were measured, and the handling property in installation and the handling property in folding were evaluated. The results were shown in Table 3.

EXAMPLE 22

Working Example

A film was formed in the same manner as in Example 20 except that 100 parts by weight of copolymer F was used instead of copolymer E. The mechanical properties and the transparency of the film were measured, and the handling property in installation and the handling property in folding were evaluated. The results were shown in Table 3.

[Preparation of Copolymer H]

610 g of deionized water, 3.6 g of ammonium perfluorooctanoate, 14.8 g of disodium hydrogen phosphate dodecahydrate, 1.59 g of sodium hydroxide, 3 g of ammonium persulfate, 0.11 g of iron sulfate, 0.10 g of ethylenediaminetetraacetatic acid and 1.8 g of 2-butanol, and then 23.5 g TFE, 2.5 g of ET and 1.0 g PP were introduced into a deaerated stainless autoclave with an internal volume of 1 l equipped with a stirrer and maintained at 25° C. 2 ml of a solution containing 1.76 g of sodium hydroxide and 0.29 g of Rongalite in relation to 10 ml of water was injected to initiate polymerization. The reaction was continued at a pressure of 16.8 kg/cm$^2$G for 7.2 hours while a 50/25/25 (molar ratio) gas mixture of TFE/ET/PP was introduced to compensate the pressure loss accompanying the reaction.

After the reaction was over, the reactor was purged of the remaining monomers to obtain 826 g of a copolymer dispersion. The dispersion was coagulated by dropwise addition of ammonium chloride then washed and dried to give 186 g of copolymer H. Copolymer H was found to comprise polymerization units derived from TFE, polymerization units derived from ET and polymerization units derived from PP in a (molar) ratio of 50.3/27.0/22.7 by NMR analysis and had a melting point of 147° C. and a flow rate by volume of 31.9 mm$^3$/sec.

TABLE 3

|  | Ex. 17 | Ex. 18 | Ex. 19 | Ex. 20 | Ex. 21 | Ex. 22 | Ex. 7 | Ex. 8 | Ex. 9 | Ex. 11 |
|---|---|---|---|---|---|---|---|---|---|---|
| Copolymer A | 100 | 100 | 100 |  |  |  | 100 |  |  |  |
| Copolymer B |  |  |  | 100 | 100 | 100 |  |  |  |  |
| Copolymer E | 50 | 120 |  | 120 |  |  |  |  |  |  |
| Copolymer F |  |  | 100 |  | 50 | 100 | ○ |  |  |  |
| Dynamic viscoelasticity (kg/mm$^2$) | 49 | 36 | 39 | 37 | 46 | 42 | 96 | 184 | 55 | 52 |
| Tensile strength (kg/mm$^2$) | 4.2 | 3.9 | 4.3 | 4.1 | 4.4 | 4.2 | 4.7 | 12.7 | 4.4 | 2.7 |
| Total light transmittance (%) | 91 | 94 | 91 | 92 | 93 | 93 | 91 | 82 | 96 | 93 |
| Haze (%) | 14 | 12 | 14 | 11 | 9 | 8 | 4 | 23 | 4 | 6 |
| Specific gravity | 1.70 | 1.73 | 1.76 | 1.76 | 1.69 | 1.75 | 1.74 | 1.37 | 2.13 | 2.13 |
| Contact angle (°) | 100.1 | 99.8 | 99.3 | 91.8 | 93.0 | 92.2 | 103.9 | 80.3 | 109.3 | 107.7 |
| Handling property in installation | ○ | ○ | ○ | ○ | ○ | ○ | Δ | X | Δ | Δ |
| Handling property in folding | ○ | ○ | ○ | ○ | ○ | ○ | Δ | X | Δ | Δ |

[Preparation of Copolymer G]

635 g of deionized water, 5 g of ammonium perfluorooctanoate, 32.4 g of TFE, 0.5 g of ET and 0.3 g of PP were introduced into a deaerated stainless autoclave with an internal volume of 1 l equipped with a stirrer and heated to 70° C. 5 ml of 30% aqueous ammonium persulfate was injected to initiate polymerization. The reaction was continued at a pressure of 15.6 kg/cm$^2$G for 6.7 hours while a 60/30/10 (molar ratio) gas mixture of TFE/ET/PP was introduced to compensate the pressure loss accompanying the reaction.

After the reaction was over, the reactor was purged of the remaining monomers to obtain 826 g of a copolymer dispersion. The dispersion was coagulated by dropwise addition of ammonium chloride then washed and dried to give 201 g of copolymer G. Copolymer G was found to comprise polymerization units derived from TFE, polymerization units derived from ET and polymerization units derived from PP in a (molar) ratio of 59.6/29.1/11.3 by NMR analysis and had a melting point of 179° C. and a flow rate by volume of 16.2 mm$^3$/sec.

EXAMPLE 23

Working Example

A composition comprising 100 parts by weight of copolymer G and 30 parts by weight of AFLAS 100N (Asahi Glass Company, polymerization units derived from TFE/ polymerization units derived from propylene=56/44 (molar ratio)) was extruded through a 30 mm φ extruder with a T die of 600 mm wide into a film of 50 μm thick at a die temperature of 220° C. The mechanical properties [dynamic viscoelesticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 4. The amounts in Table 4 were expressed in parts by weight.

EXAMPLES 24 to 25

Working Examples

Films were formed in the same manner as in Example 23 except that the amount of AFLAS 100N was changed to 60 parts by weight and 100 parts by weight. The mechanical properties and the transparency of the films were measured, and the handling property in installation and the handling property in folding were evaluated. The results were shown in Table 4.

EXAMPLES 26 to 28

Working Examples

Compositions comprising 100 parts by weight of copolymer H and the amounts shown in Table 4 of AFLAS 100N were extruded into films in the same matter as in Example 23. The mechanical properties and the transparency of the films were measured, and the handling property in installation and the handling property in folding were evaluated. The results were shown in Table 4.

through a 30 mm φ extruder with a T die of 600 mm wide into a film of 50 μm thick at a die temperature of 220° C. The mechanical properties [dynamic viscoelesticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 5. The amounts in Table 5 were expressed in parts by weight.

EXAMPLES 30 to 34

Working Examples

Films were formed by using the resin compositions shown in Table 5 in the same manner as in Example 29. The

TABLE 4

| | Ex. 23 | Ex. 24 | Ex. 25 | Ex. 26 | Ex. 27 | Ex. 28 | Ex. 7 | Ex. 8 | Ex. 9 | Ex. 11 |
|---|---|---|---|---|---|---|---|---|---|---|
| Copolymer G | 100 | 100 | 100 | | | | | | | |
| Copolymer H | | | | 100 | 100 | 100 | | | | |
| Copolymer A | | | | | | | 100 | | | |
| AFLAS 100N | 30 | 60 | 100 | 30 | 60 | 100 | | | | |
| Dynamic viscoelasticity (kg/mm$^2$) | 67 | 64 | 58 | 56 | 51 | 46 | 96 | 184 | 55 | 52 |
| Tensile strength (kg/mm$^2$) | 3.7 | 3.3 | 2.8 | 3.6 | 2.7 | 1.9 | 4.7 | 12.7 | 4.4 | 2.7 |
| Total light transmittance (%) | 94 | 92 | 89 | 94 | 93 | 91 | 91 | 82 | 96 | 93 |
| Haze (%) | 9 | 14 | 16 | 8 | 13 | 16 | 4 | 23 | 4 | 6 |
| Specific gravity | 1.58 | 1.57 | 1.54 | 1.55 | 1.52 | 1.50 | 1.74 | 1.37 | 2.13 | 2.13 |
| Contact angle (°) | 95.2 | 94.9 | 94.4 | 95.1 | 94.7 | 94.2 | 103.9 | 80.3 | 109.3 | 107.7 |
| Handling property in installation | ○ | ○ | ○ | ○ | ○ | ○ | Δ | X | Δ | Δ |
| Handling property in folding | ○ | ○ | ○ | ○ | ○ | ○ | Δ | X | Δ | Δ |

EXAMPLE 29

Working Example

A composition comprising 100 parts by weight of copolymer G and 50 parts by weight of copolymer E was extruded mechanical properties and the transparency of the films were measured, and the handling property in installation and the handling property in folding were evaluated in the same manners as in Example 29. The results were shown in Table 5.

TABLE 5

| | Ex. 29 | Ex. 30 | Ex. 31 | Ex. 32 | Ex. 33 | Ex. 34 | Ex. 7 | Ex. 8 | Ex. 9 | Ex. 11 |
|---|---|---|---|---|---|---|---|---|---|---|
| Copolymer G | 100 | 100 | 100 | | | | | | | |
| Copolymer H | | | | 100 | 100 | 100 | | | | |
| Copolymer E | 50 | 100 | | 50 | 100 | | | | | |
| Copolymer F | | | 120 | | | 120 | | | | |
| Copolymer A | | | | | | | 100 | | | |
| Dynamic viscoelasticity (kg/mm$^2$) | 51 | 41 | 43 | 49 | 41 | 39 | 96 | 184 | 55 | 52 |
| Tensile strength (kg/mm$^2$) | 3.9 | 3.5 | 3.7 | 3.8 | 3.8 | 3.5 | 4.7 | 12.7 | 4.4 | 2.7 |
| Total light transmittance (%) | 91 | 93 | 93 | 92 | 94 | 95 | 91 | 82 | 96 | 93 |
| Haze (%) | 13 | 11 | 10 | 12 | 9 | 8 | 4 | 23 | 4 | 6 |
| Specific gravity | 1.66 | 1.69 | 1.70 | 1.65 | 1.65 | 1.67 | 1.74 | 1.37 | 2.13 | 2.13 |
| Contact angle (°) | 97.5 | 97.9 | 98.0 | 97.3 | 97.8 | 99.8 | 103.9 | 80.3 | 109.3 | 107.7 |
| Handling property in installation | ○ | ○ | ○ | ○ | ○ | ○ | Δ | X | Δ | Δ |
| Handling property in folding | ○ | ○ | ○ | ○ | ○ | ○ | Δ | X | Δ | Δ |

EXAMPLE 35

Working Example

A fluorine-containing copolymer (THV200G, 3M) comprising polymerization units derived from TFE, polymerization units derived from HFP and polymerization units derived from VdF in a ratio of 40/10/50 (mol %) and having a melting point of 120° C. and a flow rate by volume of 13.7 mm$^3$/sec was extruded into a film of 60 μm thick at a temperature of 180° C. The mechanical properties [dynamic viscoelesticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 6.

EXAMPLE 36

Working Example

A fluorine-containing copolymer (THV400G, 3M) comprising polymerization units derived from TFE, polymerization units derived from HFP and polymerization units derived from VdF in a ratio of 55/10/35 (mol %) and having a melting point of 150° C. and a flow rate by volume of 39.6 mm$^3$/sec was extruded into a film of 60 μm thick at a temperature of 220° C. The film was measured and evaluated in the same manners as in Example 35. The results were shown in Table 6.

EXAMPLE 37

Working Example

A fluorine-containing copolymer (THV500G, 3M) comprising polymerization units derived from TFE, polymerization units derived from HFP and polymerization units derived from VdF in a ratio of 58/10/32 (mol %) and having a melting point of 164° C. and a flow rate by volume of 67.5 mm$^3$/sec was extruded into a film of 60 μm thick at a temperature of 220° C. The film was measured and evaluated in the same manners as in Example 35. The results were shown in Table 6.

EXAMPLE 38

Working Example 635 g of deionized water, 5 g of ammonium perfluorooctanoate, 15.8 g of TFE, 0.3 g of PP and 11.9 g of VdF were introduced into a deaerated stainless autoclave with an internal volume of 1 l equipped with a stirrer and heated to 70° C. 5 mg of 30% aqueous ammonium persulfate was injected to initiate polymerization. The reaction was continued at a pressure of 16.7 kg/cm$^2$G for 7.2 hours while a 45/45/10 (molar ratio) gas mixture of TFE/PP/VdF was introduced to compensate the pressure loss accompanying the reaction.

After the reaction was over, the reactor was purged of the remaining monomers to obtain 818 g of a copolymer dispersion. The dispersion was coagulated by dropwise addition of ammonium chloride then washed and dried to give 188 g of a copolymer. The copolymer was found to comprise polymerization units derived from TFE, polymerization units derived from PP and polymerization units derived from VdF in a (molar) ratio of 47.5/11.2/41.3 by NMR analysis and had a melting point of 127° C. and a flow rate by volume of 57.3 mm$^3$/sec.

The fluorine-containing copolymer was extruded into a film of 80 μm thick at a temperature of 200° C. The mechanical properties and transparency of the film were measured, and the handling property in installation was evaluated. The results are shown in Table 7.

EXAMPLE 39

Working Example 610 g of deionized water, 3.6 g of ammonium perfluorooctanoate, 14.8 g of disodium hydrogen phosphate dodecahydrate, 1.59 g of sodium hydroxide, 3 g of ammonium persulfate, 0.11 g of iron sulfate, 0.10 g of ethylenediaminetetraacetic acid and 1.8 g of 2-butanol, and then 17.5 g of TFE, 1.5 g of PP and 9.0 g of VdF were introduced into a deaerated stainless autoclave with an internal volume of 1 l equipped with a stirrer and maintained at 25° C. 2 ml of a solution containing 1.76 g of sodium hydroxide and 0.29 g of Rongalite in relation to 10 ml of water was injected to initiate polymerization.

The reaction was continued at a pressure of 18.7 kg/cm$^2$G for 10.2 hours while a 60/15/25 (molar ratio) gas mixture of TFE/PP/VdF was introduced to compensate the pressure loss accompanying the reaction. After the reaction was over, the reactor was purged of the remaining monomers to obtain 832 g of a copolymer dispersion. The dispersion was coagulated by dropwise addition of ammonium chloride then

TABLE 6

| | Ex. 35 | Ex. 36 | Ex. 37 | Ex. 7 | Ex. 8 | Ex. 9 | Ex. 11 |
|---|---|---|---|---|---|---|---|
| Dynamic viscoelasticity (kg/mm$^2$) | 12 | 43 | 44 | 96 | 184 | 55 | 52 |
| Tensile strength (kg/mm$^2$) | 2.8 | 3.2 | 3.2 | 4.7 | 12.7 | 4.4 | 2.7 |
| Total light transmittance (%) | 98 | 96 | 96 | 91 | 82 | 96 | 93 |
| Haze (%) | 3 | 3 | 6 | 4 | 23 | 4 | 6 |
| Specific gravity | 1.94 | 1.98 | 2.00 | 1.74 | 1.37 | 2.13 | 2.13 |
| Contact angle (°) | 94.4 | 93.8 | 93.5 | 103.9 | 80.3 | 109.3 | 107.7 |
| Handling property in installation | ○ | ○ | ○ | Δ | X | Δ | Δ |
| Handling property in folding | ○ | ○ | ○ | Δ | X | Δ | Δ | washed and dried to give 179 g of a copolymer. The copolymer was found to comprise polymerization units derived from TFE, polymerization units derived from PP and polymerization units derived from VdF PP in a (molar) ratio of 62.3/18.1/19.6 by NMR analysis and had a melting point of 155° C. and a flow rate by volume of 27.1 mm³/sec. A film was formed and evaluated in the same manners as in Example 38. The results are shown in Table 7.

dried to give 2.1 kg of a copolymer. The copolymer was found to comprise polymerization units derived from TFE, polymerization units derived from PP and polymerization units derived from VdF in a (molar) ratio of 51.8/12.7/35.5 by NMR analysis and had a melting point of 147° C. and a flow rate by volume of 28.6 mm³/sec. A film was formed and evaluated in the same manners as in Example 38. The results are shown in Table 7.

TABLE 7

|  | Ex. 38 | Ex. 39 | Ex. 40 | Ex. 41 | Ex. 7 | Ex. 8 | Ex. 9 | Ex.10 |
| --- | --- | --- | --- | --- | --- | --- | --- | --- |
| Dynamic viscoelasticity (kg/mm²) | 35 | 46 | 48 | 41 | 96 | 184 | 55 | 52 |
| Tensile strength (kg/mm²) | 2.0 | 2.1 | 1.9 | 2.0 | 4.7 | 12.7 | 4.4 | 2.7 |
| Total light transmittance (%) | 94 | 93 | 91 | 93 | 91 | 82 | 96 | 93 |
| Haze (%) | 8 | 11 | 12 | 9 | 4 | 23 | 4 | 6 |
| Specific gravity | 1.77 | 1.81 | 1.83 | 1.79 | 1.74 | 1.37 | 2.13 | 2.13 |
| Contact angle (°) | 99.0 | 100.2 | 101.5 | 99.5 | 103.9 | 80.3 | 109.3 | 107.7 |
| Handling property in installation | ○ | ○ | ○ | ○ | Δ | X | Δ | Δ |
| Handling property in folding | ○ | ○ | ○ | ○ | Δ | X | Δ | Δ |

EXAMPLE 40

Working Example 11.8 kg of deionized water, 520 g of t-butanol, 135 g of methanol, 50 g of ammonium perfluorooctanoate, 420 g of TFE, 29 g of PP and 134 g of VdF were introduced into a deaerated stainless autoclave with an internal volume of 20 l equipped with a stirrer and heated to 70° C. 180 ml of 30% aqueous ammonium persulfate was injected to initiate polymerization. The reaction was continued at a pressure of 17.6 kg/cm²G for 9.6 hours while a 70/10/20 (molar ratio) gas mixture of TFE/PP/VdF was introduced to compensate the pressure loss accompanying the reaction. The reactor was purged of the remaining monomers to obtain 15.2 kg of a copolymer dispersion. The dispersion was coagulated by dropwise addition of ammonium chloride then washed and dried to give 2.3 kg of a copolymer. The copolymer was found to comprise polymerization units derived from TFE, polymerization units derived from PP and polymerization units derived from VdF in a (molar) ratio of 71.2/10.2/18.7 by NMR analysis and had a melting point of 164° C. and a flow rate by volume of 4.8 mm³/sec. A film was formed and evaluated in the same manners as in Example 38. The results are shown in Table 7.

EXAMPLE 41

Working Example 11.8 kg of deionized water, 575 g of t-butanol, 96 g of methanol, 60 g of ammonium perfluorooctanoate, 266 g of TFE, 29 g of PP and 233 g of VdF were introduced into a deaerated stainless autoclave with an internal volume of 20 T equipped with a stirrer and heated to 70° C. 180 ml of 30% aqueous ammonium persulfate was injected to initiate polymerization. The reaction was continued at a pressure of 17.4 kg/cm²G for 7.7 hours while a 50/12/38 (molar ratio) gas mixture of TFE/PP/VdF was introduced to compensate the pressure loss accompanying the reaction. The reactor was purged of the remaining monomers to obtain 14.7 kg of a copolymer dispersion. The dispersion was coagulated by dropwise addition of ammonium chloride then washed and

EXAMPLE 42

Working Example 635 g of deionized water, 5 g of ammonium perfluorooctanoate, 14.9 g of TFE, 1.4 g of PP, 9.7 g of VdF and 1.2 g of PFBE were introduced into a deaerated stainless autoclave with an internal volume of 1 l equipped with a stirrer and heated to 80° C. 5 ml of 30% aqueous ammonium persulfate was injected to initiate polymerization. The reaction was carried out at a pressure of 18.3 kg/cm²G while a 58/10/32 (molar ratio) gas mixture of TFE/PP/VdF was introduced to compensate the pressure loss accompanying the reaction. The reaction was continued for 8 hours while 0.1 ml of PFBE was added in relation to 3 g of the gas mixture.

After the reaction was over, the reactor was purged of the remaining monomers to give 840 g of a copolymer dispersion. The dispersion was coagulated by dropwise addition of sulfuric acid, then washed and dried to give 194 g of a copolymer. The copolymer was found to comprise polymerization units derived from TFE, polymerization units derived from PP, polymerization units derived from VdF and polymerization units derived from PFBE in a (molar) ratio of 59.9/11.4/27.3/1.4 by NMR analysis and had a melting point of 139° C. and a flow rate by volume of 37.7 mm³/sec. The copolymer was extruded into a film of 80 μm thick at a temperature of 200° C. The mechanical properties [dynamic viscoelesticity (kg/mm²) and tensile strength (kg/mm²)] and the transparency [total light transmittance (%) and haze (%)] of the film were measured, and the handling property in installation and the handling property in folding were evaluated. The results were shown in Table 8.

EXAMPLE 43

Working Example 610 g of deionized water, 3.6 g of ammonium perfluorooctanoate, 14.8 g of disodium hydrogen phosphate dodecahydrate, 1.59 g of sodium hydroxide, 3 g of ammonium persulfate, 0.11 g of iron sulfate, 0.10 g of ethylenediaminetetraacetatic acid and 1.8 g of 2-butanol, and then 22.6 g of TFE, 3.5 g of PP, 16.0 g of VdF and 1.3 g of (perfluorooctyl)ethylene ($CH_2=CH-C_8F_{17}$, hereinafter referred to as PFOE) were introduced into a deaerated stainless autoclave with an internal volume of 1 l equipped with a stirrer and maintained at 25° C. 2 ml of a solution containing 1.76 g of sodium hydroxide and 0.29 g of Rongalite in relation to 10 ml of water was injected to initiate polymerization. The reaction was carried at a pressure of 20.3 kg/cm$^2$G while a 53/10/37 (molar ratio) gas mixture of TFE/PP/TdF was introduced to compensate the pressure loss accompanying the reaction. The reaction was continued for 11 hours while 0.1 ml of PFOF was added in relation to 5 g of the gas mixture. After the reaction was over, the reactor was purged of the remaining monomers to obtain 827 g of a copolymer dispersion. The dispersion was coagulated by dropwise addition of ammonium chloride then washed and dried to give 187 g of a copolymer. The composition measure by NMR, the melting point and the flow rate by volume of the copolymer are shown in Table 8. A film was formed in the same manner as in Example 42. The mechanical properties and the transparency of the film were measured, and the handling property in installation and the handling property in folding were evaluated. The results are shown in Table 8.

EXAMPLE 44

Working Example 11.8 kg of deionized water, 520 g of t-butanol, 135 g of methanol, 50 g of ammonium perfluorooctanoate, 399 g of TFE, 44 g of PP, 125 g of VdF and 35 g of perfluoro(propyl vinyl ether) ($CF_2=CFC_3F_7$, hereinafter referred to as PPVE) were introduced into a deaerated stainless autoclave with an internal volume of 20 l equipped with a stirrer and heated to 70° C. 180 ml of 30% aqueous ammonium persulfate was injected to initiate polymerization. The reaction was carried at a pressure of 17.6 kg/cm$^2$G while a 65/20/15 (molar ratio) gas mixture of TFE/PP/TdF was introduced to compensate the pressure loss accompanying the reaction. The reaction was continued for 9.6 hours while 0.1 mg of PFOF was added in relation to 5 g of the gas mixture. The reactor was purged of the remaining monomers to obtain 15.2 kg of a copolymer dispersion. The dispersion was coagulated by dropwise addition of ammonium chloride then washed and dried to give 2.3 kg of a copolymer. The composition measure by NMR, the melting point and the flow rate by volume of the copolymer are shown in Table 8. A film was formed in the same manner as in Example 42. The mechanical properties and the transparency of the film were measured, and the handling property in installation and the handling property in folding were evaluated. The results are shown in Table 8.

EXAMPLE 45

Working Example 11.8 kg of deionized water, 575 t-butanol, 96 g of methanol, 60 g of ammonium perfluorooctanoate, 266 g of TFE, 29 g of PP, 233 g of VdF and 16.3 g of perfluoro(2-methoxypropyl vinyl ether) (compound of formula 3 wherein n=0, and m=1, $CF_3OCF(CF_3)CF_2OCF=CF_2$, hereinafter referred to as PMVE) were introduced into a deaerated stainless autoclave with an internal volume of 20 l equipped with a stirrer and heated to 70° C. 180 ml of 30% aqueous ammonium persulfate was injected to initiate polymerization. The reaction was carried at a pressure of 17.4 kg/cm$^2$G while a 44/12/44 (molar ratio) gas mixture of TFE/PP/TdF was introduced to compensate the pressure loss accompanying the reaction. The reaction was continued for 7.7 hours while 0.1 ml of PMVE was added in relation to 7 g of the gas mixture. The reactor was purged of the remaining monomers to obtain 14.7 kg of a copolymer dispersion. The dispersion was coagulated by dropwise addition of ammonium chloride then washed and dried to give 2.1 kg of a copolymer. The composition measure by NMR, the melting point and the flow rate by volume of the copolymer are shown in Table 8. A film was formed in the same manner as in Example 42. The mechanical properties and the transparency of the film were measured, and the handling property in installation and the handling property in folding were evaluated. The results are shown in Table 8.

TABLE 8

| | Ex. 42 | Ex. 43 | Ex. 44 | Ex. 45 | Ex. 7 | Ex. 8 | Ex. 9 | Ex. 10 |
|---|---|---|---|---|---|---|---|---|
| (Composition of copolymer: molar ratio) | | | | | | | | |
| TFE | 59.9 | 53.3 | 67.4 | 44.3 | | | | |
| PP | 11.4 | 13.8 | 19.7 | 13.1 | | | | |
| VdF | 27.4 | 32.0 | 11.8 | 41.9 | | | | |
| PFBE | 1.4 | | | | | | | |
| PFOE | | 0.4 | | | | | | |
| PPVE | | | 1.1 | | | | | |
| PMVE | | | | 0.7 | | | | |
| Melting point (° C.) | 139 | 141 | 154 | 113 | | | | |
| Flow rate by volume (mm$^3$/sec) | 37.7 | 14.9 | 8.4 | 61.4 | | | | |
| Dynamic viscoelasticity (kg/mm$^2$) | 42 | 38 | 26 | 22 | 96 | 184 | 55 | 52 |
| Tensile strength (kg/mm$^2$) | 2.2 | 3.1 | 2.0 | 2.5 | 4.7 | 12.7 | 4.4 | 2.7 |
| Total light transmittance (%) | 91 | 91 | 93 | 92 | 91 | 82 | 96 | 93 |
| Haze (%) | 12 | 11 | 8 | 9 | 4 | 23 | 4 | 6 |
| Specific gravity | 1.78 | 1.76 | 1.79 | 1.76 | 1.74 | 1.37 | 2.13 | 2.13 |
| Contact angle (°) | 99.3 | 97.8 | 99.1 | 98.2 | 103.9 | 80.5 | 109.3 | 107.7 |
| Handling property in installation | ○ | ○ | ○ | ○ | Δ | X | Δ | Δ |

TABLE 8-continued

|  | Ex. 42 | Ex. 43 | Ex. 44 | Ex. 45 | Ex. 7 | Ex. 8 | Ex. 9 | Ex. 10 |
|---|---|---|---|---|---|---|---|---|
| Handling property in folding | ◯ | ◯ | ◯ | ◯ | Δ | X | Δ | Δ |

EXAMPLE 46

Working Example 635 g of deionized water, 5 g of ammonium perfluorooctanoate, 32.4 g of TFE, 0.5 g of ET and 0.3 g of PP were introduced into a deaerated stainless autoclave with an internal volume of 1 l equipped with a stirrer and heated to 70° C. 5 ml of 5% aqueous ammonium persulfate was injected to initiate polymerization. The reaction was continued at a pressure of 15.6 kg/cm$^2$G for 6.7 hours while a 60/30/10 (molar ratio) gas mixture of TFE/ET/PP was introduced to compensate the pressure loss accompanying the reaction.

After the reaction was over, the reactor was purged of the remaining monomers to obtain 826 g of a copolymer dispersion. The dispersion was coagulated by dropwise addition of ammonium chloride then washed and dried to give 201 g of a copolymer. The copolymer was found to comprise polymerization units derived from TFE, polymerization units derived from ET and polymerization units derived from PP in a (molar) ratio of 59.6/29.1/11.3 by NMR analysis and had a melting point of 179° C. and a flow rate by volume of 16.2 mm$^3$/sec. The fluorine-containing copolymer was extruded into a film of 80 μm thick at 230° C. The mechanical properties and the transparency of the film were measured, and the handling property in installation and the handling property in folding were evaluated. The results are shown in Table 9.

EXAMPLE 47

Working Example 610 g of deionized water, 3.6 g of ammonium perfluorooctanoate, 14.8 g of disodium hydrogen phosphate dodecahydrate, 1.59 g of sodium hydroxide, 3 g of ammonium persulfate, 0.11 g of iron sulfate, 0.10 g of ethylenediaminetetraacetatic acid and 1.8 g of 2-butanol, and then 23.5 g of TFE, 2.5 g of ET and 1.0 g of PP were introduced into a deaerated stainless autoclave with an internal volume of 1 l equipped with a stirrer and maintained at 25° C. 2 ml of a solution containing 1.76 g of sodium hydroxide and 0.29 g of Rongalite in relation to 10 ml of water was injected to initiate polymerization.

The reaction was continued at a pressure of 16.8 kg/cm$^2$G for 7.2 hours while a 50/30/20 (molar ratio) gas mixture of TFE/ET/PP was introduced to compensate the pressure loss accompanying the reaction. After the reaction was over, the reactor was purged of the remaining monomers to obtain 826 g of a copolymer dispersion. The dispersion was coagulated by dropwise addition of ammonium chloride then washed and dried to give 186 g of a copolymer. The copolymer was found to comprise polymerization units derived from TFE, polymerization units derived from ET and polymerization units derived from PP in a (molar) ratio of 25 50.3/27.01/22.7 by NMR analysis and had a melting point of 147° C. and a flow rate by volume of 31.9 mm$^3$/sec. The fluorine-containing copolymer was extruded into a film of 80 μm thick at 230° C. The mechanical properties and the transparency of the film were measured, and the handling property in installation and the handling property in folding were evaluated. The results are shown in Table 9.

EXAMPLE 48

Working Example 11.8 kg of deionized water, 520 g of t-butanol, 135 g of methanol, 50 g of ammonium perfluorooctanoate, 402 g of TFE, 44 g of ET and 18 g of PP were introduced into a deaerated stainless autoclave with an internal volume of 20 l equipped with a stirrer and heated to 70° C. 180 ml of 5% aqueous ammonium persulfate was injected to initiate polymerization. The reaction was continued at a pressure of 17.6 kg/cm$^2$G for 9.6 hours while a 50/30/20 (molar ratio) gas mixture of TFE/ET/PP was introduced to compensate the pressure loss accompanying the reaction. The reactor was purged of the remaining monomers to obtain 15.2 kg of a copolymer dispersion. The dispersion was coagulated by dropwise addition of ammonium chloride then washed and dried to give 2.3 kg of a copolymer. The copolymer was found to comprise polymerization units derived from TFE, polymerization units derived from ET and polymerization units derived from PP in a (molar) ratio of 48.1/33.7/18.2 by NMR analysis and had a melting point of 164° C. and a flow rate by volume of 57.4 mm$^3$/sec. The fluorine-containing copolymer was extruded into a film of 80 μm thick at 230° C. The mechanical properties and the transparency of the film were measured, and the handling property in installation and the handling property in folding were evaluated. The results are shown in Table 9.

TABLE 9

|  | Ex. 46 | Ex. 47 | Ex. 48 | Ex. 7 | Ex. 8 | Ex. 9 | Ex. 11 |
|---|---|---|---|---|---|---|---|
| Dynamic viscoelasticity (kg/mm$^2$) | 51 | 44 | 45 | 96 | 184 | 55 | 52 |
| Tensile strength (kg/mm$^2$) | 4.6 | 4.4 | 4.3 | 4.7 | 12.7 | 4.4 | 2.7 |
| Total light transmittance (%) | 92 | 93 | 91 | 91 | 82 | 96 | 93 |
| Haze (%) | 11 | 10 | 8 | 4 | 23 | 4 | 6 |
| Specific gravity | 1.61 | 1.58 | 1.55 | 1.74 | 1.37 | 2.13 | 2.13 |

TABLE 9-continued

| | Ex. 46 | Ex. 47 | Ex. 48 | Ex. 7 | Ex. 8 | Ex. 9 | Ex. 11 |
|---|---|---|---|---|---|---|---|
| Contact angle (°) | 96.7 | 96.1 | 95.8 | 103.9 | 80.3 | 109.3 | 107.7 |
| Handling property in installation | ○ | ○ | ○ | Δ | X | Δ | Δ |
| Handling property in folding | ○ | ○ | ○ | Δ | X | Δ | Δ |

EXAMPLE 49

Working Example 1966 g of perfluorocyclohexane, 14.2 g of methanol, 250 g of TFE, 7.8 g of ET and 31.8 g of PFBE were introduced into a deaerated stainless autoclave with an internal volume of 2 a equipped with a stirrer and heated to 65° C. 7 ml of 50% t-butyl peroxyisobutyrate in perfluorocyclohexane was injected to initiate polymerization.

The reaction was carried out at a pressure of 14.3 kg/cm G while a 60/40 (molar ratio) gas mixture of TFE/ET was introduced to compensate the pressure loss accompanying the reaction. The reaction was continued for 8 hours while 0.1 ml of PFBE was added in relation to 1 g of the gas mixture. After the reaction was over, the reactor was purged of the remaining monomers, and the copolymer dispersant was filtered, washed and dried to give 204 g of a white copolymer. The copolymer was found to comprise polymerization units derived from TFE and polymerization units derived from ET in a (molar) ratio of 61.2/38.8 and 4.0 mol % of polymerization units derived from PFBE by NMR analysis and had a melting point of 220° C. and a flow rate by volume of 85.2 mm$^3$/sec. The copolymer was extruded into a film of 60 μm thick at 270° C. The mechanical properties [dynamic viscoelesticity (kg/mm$^2$) and tensile strength (kg/mm$^2$)] and the transparency [total light transmittance (%) and haze (%)] of the film were measured, and the handling property in installation and the handling property in folding were evaluated. The results were shown in Table 10.

EXAMPLE 50

Working Example 610 g of deionized water, 3.6 g of ammonium perfluorooctanoate, 14.8 g of disodium hydrogen phosphate dodecahydrate, 1.59 g of sodium hydroxide, 3 g of ammonium persulfate, 0.11 g of iron sulfate, 0.10 g of ethylenediaminetetraacetatic acid and 1.8 g of 2-butanol, and then 32.2 g of TFE, 0.8 g of ET and 1.6 g of (perfluorohexyl) ethylene (hereinafter referred to as PFHE) were introduced into a deaerated stainless autoclave with an internal volume of 1 l equipped with a stirrer and maintained at 25° C. 2 ml of a solution containing 1.76 g of sodium hydroxide and 0.29 g of Rongalite in relation to 10 ml of water was injected to initiate polymerization.

The reaction was carried out at a pressure of 15.9 kg/cm$^2$G while a 65/35 (molar ratio) gas mixture of TFE/ET was introduced to compensate the pressure loss accompanying the reaction. The reaction was continued for 8.4 hours while 0.1 ml of PFHE was added in relation to 3 g of the gas mixture. After the reaction was over, the reactor was purged of the remaining monomers to give 811 g of a copolymer dispersion. The dispersion was coagulated by dropwise addition of ammonium chloride then washed and dried to give 190 g of a copolymer. The copolymer was found to comprise polymerization units derived from TFE and polymerization units derived from ET in a (molar) ratio of 65.0/35.0 and 1.3 mol % of polymerization units derived from PFHE by NMR analysis and had a melting point of 216° C. and a flow rate by volume of 42.1 mm$^3$/sec. The copolymer was extruded into a film of 60 μm thick at 270° C. The mechanical properties and the transparency of the film were measured, and the handling property in installation and the handling property in folding were evaluated. The results were shown in Table 10.

EXAMPLE 51

Working Example 11.8 kg of deionized water, 520 g of t-butanol, 180 g of methanol, 50 g of ammonium perfluorooctanoate, 386 g of TFE, 54 g of ET and 95 g of PFBE were introduced into a deaerated stainless autoclave with an internal volume of 20 l equipped with a stirrer and heated to 70° C. 180 ml of 5% aqueous ammonium persulfate was injected to initiate polymerization.

The reaction was carried out at a pressure of 16.2 kg/cm$^2$G while a 60/30 (molar ratio) gas mixture of TFE/ET was introduced to compensate the pressure loss accompanying the reaction. The reaction was continued for 9.6 hours while 1 ml of PFBE was added in relation to 10 g of the gas mixture. The reactor was purged of the remaining monomers to give 14.9 kg of a copolymer dispersion. The dispersion was coagulated by dropwise addition of ammonium chloride then washed and dried to give 2.4 kg of a copolymer. The copolymer was found to comprise polymerization units derived from TFE and polymerization units derived from ET in a (molar) ratio of 65.5/34.5 and 6.5 mol % of polymerization units derived from PFBE by NMR analysis and had a melting point of 21220 C. and a flow rate by volume of 26.9 mm$^3$/sec. The copolymer was extruded into a film of 60 μm thick at 270° C. The mechanical properties and the transparency of the film were measured, and the handling property in installation and the handling property in folding were evaluated. The results were shown in Table 10.

TABLE 10

| | Ex. 49 | Ex. 50 | Ex. 51 | Ex. 7 | Ex. 8 | Ex. 9 | Ex. 11 |
|---|---|---|---|---|---|---|---|
| Dynamic viscoelasticity (kg/mm$^2$) | 61 | 57 | 52 | 96 | 184 | 55 | 52 |

TABLE 10-continued

|  | Ex. 49 | Ex. 50 | Ex. 51 | Ex. 7 | Ex. 8 | Ex. 9 | Ex. 11 |
|---|---|---|---|---|---|---|---|
| Tensile strength (kg/mm²) | 4.5 | 4.3 | 4.3 | 4.7 | 12.7 | 4.4 | 2.7 |
| Total light transmittance (%) | 93 | 94 | 92 | 91 | 82 | 96 | 93 |
| Haze (%) | 11 | 9 | 12 | 4 | 23 | 4 | 6 |
| Specific gravity | 1.73 | 1.76 | 1.75 | 1.74 | 1.37 | 2.13 | 2.13 |
| Contact angle (°) | 95.6 | 96.7 | 97.4 | 103.9 | 80.3 | 109.3 | 107.7 |
| Handling property in installation | ◯ | ◯ | ◯ | Δ | X | Δ | Δ |
| Handling property in folding | ◯ | ◯ | ◯ | Δ | X | Δ | Δ |

The agricultural film of the present invention has low dynamic viscoelastic modulus and flexibility and hence is easy to spread out and suitable as an agricultural covering material for agricultural and horticultural facilities.

What is claimed is:

1. An agricultural covering material made of a fluorine-containing polymer film having a dynamic viscoelastic modulus of from 1 to 70 kg/mm², a tensile strength of from 1.5 to 5.0 kg/mm², a specific gravity of from 1.0 to 2.0 and a contact angle with water of at most 106°.

2. The agricultural covering material according to claim 1, which is made of a film molded from a composition comprising 100 parts by weight of a tetrafluoroethylene-ethylene copolymer and from 5 to 100 parts by weight of a tetrafluoroethylene-propylene elastic copolymer.

3. The agricultural covering material according to claim 2, wherein the tetrafluoroethylene-propylene elastic copolymer comprises from 5 to 70 mol % of polymerization units derived from propylene.

4. The agricultural covering material according to claim 2, wherein the tetrafluoroethylene-ethylene copolymer comprises polymerization units derived from tetrafluoroethylene and polymerization units derived from ethylene in a (molar) ratio of from 70/30 to 30/70 and further comprises from 0.1 to 10 mol % of polymerization units derived from a compound represented by $CH=CH-C_nF_{2n+1}$ (wherein n is an integer of from 2 to 10).

5. The agricultural covering material according to claim 1, which is made of a film molded from a composition comprising 100 parts by weight of a tetrafluoroethylene-ethylene copolymer and from 5 to 80 parts by weight of a tetrafluoroethylene-propylene-ethylene copolymer.

6. The agricultural covering material according to claim 5, wherein the tetrafluoroethylene-ethylene copolymer comprises polymerization units derived from tetrafluoroethylene and polymerization units derived from ethylene in a (molar) ratio of from 70/30 to 30/70, and further comprises from 0.1 to 10 mol % of polymerization units derived from a compound represented by $CH=CH-C_nF_{2n+1}$ (wherein n is an integer of from 2 to 10).

7. The agricultural covering material according to claim 5, wherein the tetrafluoroethylene-propylene-ethylene comprises from 40 to 70 mol % of polymerization units derived from tetrafluoroethylene, from 10 to 50 mol % of polymerization units derived from propylene and from 1 to 50 mol % of polymerization units derived from ethylene.

8. The agricultural covering material according to claim 1, which is made of a film molded from a composition comprising 100 parts by weight of a tetrafluoroethylene-ethylene copolymer and from 5 to 200 parts by weight of a tetrafluoroethylene-propylene-vinylidene fluoride copolymer.

9. The agricultural covering material according to claim 8, wherein the tetrafluoroethylene-ethylene copolymer comprises polymerization units derived from tetrafluoroethylene and polymerization units derived from ethylene in a (molar) ratio of from 70/30 to 30/70 and further comprises from 0.1 to 10 mol % of polymerization units derived from a compound represented by $CH=CH-C_nF_{2n+1}$ (wherein n is an integer of from 2 to 10).

10. The agricultural covering material according to claim 8, wherein the tetrafluoroethylene-propylene-vinylidene fluoride copolymer comprises from 5 to 85 mol % of polymerization units derived from tetrafluoroethylene, from 1 to 45 mol % of polymerization units derived from propylene and from 5 to 70 mol % of polymerization units derived from vinylidene fluoride.

11. The agricultural covering material according to claim 1, which is made of a film molded from a composition comprising 100 parts by weight of a tetrafluoroethylene-ethylene-propylene copolymer and from 5 to 100 parts by weight of a tetrafluoroethylene-propylene elastic copolymer.

12. The agricultural covering material according to claim 11, wherein the tetrafluoroethylene-ethylene-propylene copolymer comprises 40 to 70 mol % of polymerization units derived from tetrafluoroethylene, from 20 to 50 mol % of polymerization units derived from ethylene and from 5 to 40 mol % of polymerization units derived from propylene.

13. The agricultural covering material according to claim 11 or 12, wherein the tetrafluoroethylene-propylene elastic copolymer comprises from 5 to 70 mol % of polymerization units derived from propylene.

14. The agricultural covering material according to claim 1, which is made of a film molded from a composition comprising 100 parts by weight of a tetrafluoroethylene-ethylene-propylene copolymer and from 5 to 200 parts by weight of a tetrafluoroethylene-propylene-vinylidene fluoride copolymer.

15. The agricultural covering material according to claim 14, wherein the tetrafluoroethylene-propylene-vinylidene fluoride copolymer comprises from 5 to 85 wt % of polymerization units derived from tetrafluoroethylene, from 1 to 45 mol % of polymerization units derived from propylene and from 5 to 70 mol % of polymerization units derived from vinylidene fluoride.

16. The agricultural covering material according to claim 14, wherein the tetrafluoroethylene-ethylene-propylene copolymer comprises from 40 to 70 mol % of polymerization units derived from tetrafluoroethylene, from 20 to 50 mol % of polymerization units derived from ethylene and from 5 to 40 mol % of polymerization units derived from propylene.

17. The agricultural covering material according to claim 1, which is made of a film of a fluorine-containing copolymer comprising from 5 to 84 mol % of polymerization units derived from tetrafluoroethylene, from 1 to 45 mol % of polymerization units derived from hexafluoropropylene and from 5 to 90 mol % of polymerization units derived from vinylidene fluoride.

18. The agricultural covering material according to claim 1, which is made of a film of a fluorine-containing copolymer comprising from 5 to 85 mol % of polymerization units derived from tetrafluoroethylene, from 1 to 50 mol % of polymerization units derived from propylene and from 5 to 70 mol % of polymerization units derived from vinylidene fluoride.

19. The agricultural covering material according to claim 1, which is made of a film of a fluorine-containing copolymer comprising from 0.05 to 20 mol % in total of polymerization units derived from at least one fluorinated comonomer represented by the following formula 1, formula 2 or formula 3, 30 to 85 mol % of polymerization units derived from tetrafluoroethylene, from 1 to 30 mol % of polymerization units derived from propylene and from 5 to 68.5 mol % of polymerization units derived from vinylidene fluoride, wherein Y is a fluorine atom or a hydrogen atom, $R^f$ is a $C_{2-12}$ bivalent fluorinated organic group, X is a fluorine atom, a chlorine atom or a hydrogen atom, n is an integer of from 0 to 3, and m is an integer of from 1 to 4.

$XR^fCY=CH_2$  formula 1

$XR^fOCF=CF_2$  formula 2

$CF_3(CF_2)_n(OCF(CF_3)CF_2)_mOCF=CF_2$  formula 3.

20. The agricultural covering material according to claim 1, which is made of a film of a fluorine-containing copolymer comprising from 40 to 75 mol % of polymerization units derived from tetrafluoroethylene, from 20 to 50 mol % of polymerization units derived from ethylene and from 5 to 40 mol % of polymerization units derived from propylene.

21. The agricultural covering material according to claim 1, which is made of a film of a tetrafluoroethylene-ethylene polymer which comprises polymerization units derived from tetrafluoroethylene and polymerization units derived from ethylene in a (molar) ratio of from 57/43 to 67/33 and comprises from 0.1 to 10 (mol %) of polymerization units derived from a third vinyl monomer.

22. The agricultural covering material according to claim 21, wherein the polymerization units derived from tetrafluoroethylene/the polymerization units derived from ethylene is from 61/39 to 67/33 (molar ratio).

23. The agricultural covering material according to claim 21, wherein the third vinyl monomer is a (perfluoroalkyl) ethylene represented by $CH_2=CH-C_nF_{2n+1}$ (wherein n is an integer of from 2 to 10).

* * * * *